US006564498B2

(12) United States Patent
Sawtell

(10) Patent No.: US 6,564,498 B2
(45) Date of Patent: May 20, 2003

(54) FISHING REEL BAG

(76) Inventor: Lee Raab Sawtell, 108 Crestwood Ct., Kitty Hawk, NC (US) 27949

( * ) Notice: Subject to any disclaimer, the term of this patent is extended or adjusted under 35 U.S.C. 154(b) by 0 days.

(21) Appl. No.: 09/955,456

(22) Filed: Sep. 18, 2001

(65) Prior Publication Data

US 2002/0032978 A1 Mar. 21, 2002

Related U.S. Application Data

(60) Provisional application No. 60/233,930, filed on Sep. 20, 2000.

(51) Int. Cl.[7] ............................................... A01K 97/08
(52) U.S. Cl. ..................... 43/26; 150/154; 206/304.2; 206/315.1
(58) Field of Search .......................... 43/26; 150/145, 150/146, 154, 156, 160, 161, 162; 206/288, 298, 304.2, 315.11

(56) References Cited

U.S. PATENT DOCUMENTS

| | | | |
|---|---|---|---|
| 2,618,880 A | | 1/1952 | Sourek |
| 3,368,655 A | * | 2/1968 | Purdy ........................ 12/120.5 |
| 3,762,592 A | * | 10/1973 | Mayes ..................... 206/315.11 |
| 4,136,478 A | * | 1/1979 | Wycosky ................. 206/315.11 |
| 4,556,082 A | * | 12/1985 | Riley et al. .................. 137/375 |
| 4,641,454 A | | 2/1987 | Ray |
| 4,858,361 A | * | 8/1989 | White .......................... 150/154 |
| 4,876,819 A | | 10/1989 | Clifford |
| 5,501,029 A | | 3/1996 | McDaniel |
| 5,699,632 A | * | 12/1997 | Stout et al. ..................... 43/25 |
| 6,085,695 A | * | 7/2000 | Miller et al. ................. 119/795 |
| 6,263,610 B1 | | 7/2001 | Doubts |

FOREIGN PATENT DOCUMENTS

| GB | 07934835 | * | 4/1981 | .......... A01K/97/00 |

* cited by examiner

Primary Examiner—Charles T. Jordan
Assistant Examiner—Susan C. Alimenti
(74) Attorney, Agent, or Firm—Jennifer Meredith, Esq.

(57) ABSTRACT

A protective covering for a fishing reel and attached rod segment which consists of a single continuous piece of waterproof fabric to which drawstrings are attached. The reel bag possesses four sewn seams to provide a substantially conforming shape to cover the reel, with an opening to enclose the reel foot and reel handle. The reel bag is self-supporting in a free upstanding position with provision for a hook keeper to allow for the easy and safe keeping of lures. The cover is used to protect the reel from dust, sand and other foreign elements, and to hold various sundry items.

3 Claims, 4 Drawing Sheets

FISHING REEL BAG

This application makes reference to and claims the filing date of provisional application No. 60/233,930 filed Sep. 20, 2000.

FIELD OF THE INVENTION

The instant invention generally relates to fishing reel covers and more particularly to a fishing reel cover fashioned from a single continuous piece of waterproof fabric. The bag possesses four sewn seams to provide a substantially conforming shape to cover the reel, with an opening to enclose the reel foot and reel handle. The reel bag is self-supporting in a free upstanding position with provision for a hook keeper to allow for the easy and safe keeping of lures.

BACKGROUND AND SUMMARY OF THE INVENTION

As a rule fishing reels have many intricate and moving parts. Fishing reels are often exposed to the elements and this exposes many of the intricate parts of the reel to dirt and moisture. With each kind of reel there are a series of fragile and necessary parts, which if damaged or dirtied, result in the inability of the reel to function as intended. For example with a spinning reel, the bail mechanism is such a necessary part and without proper function, the reel simply will not work.

Also, the average fisherman carries various other items necessary to fish. These include, without limitation, Loran and GPS navigational equipment, spools of fishing line, and rigid leaders on holders.

Although protective covers for rod-mounted reels are known in the art, they have various shortcomings. For example, U.S. Pat. No. 4,867,819 discloses a fishing reel protector having a plurality of pockets and a flexible connecting member extending between the pockets. However, the device is merely wrapped about the fishing rod after the reel has been disposed within one of the pockets and in at least one embodiment, a portion of the reel is exposed to the elements.

Similarly, U.S. Pat. No. 5,501,029 discloses a fishing reel cover for covering a fishing reel including a first side member, a second side member, and a rotatable spool extending between the first and second side members with each of the first and second side members having an outer perimeter wall. The '029 patent further discloses a flexible body member for extending around the outer perimeter walls of the first and second side members of the fishing reel and for covering the rotatable spool of the fishing reel. This device is flawed in that it is complex, difficult to attach, is incapable of storing various sundries and not easily adaptable to a multitude of different sized reels.

It is also known within the art to utilize a cylindrical sleeve with drawstrings at both ends, as described in U.S. Pat. No. 6,263,610. The '610 patent discloses a protective covering for a fishing reel and attached rod segment which consists of a cylindrical sleeve made of single-layer waterproof fabric to which drawstrings, provided with a spring actuated locking devices, are attached on both ends. The device is slid up over the base of the rod, up over the reel, at which point the drawstrings are pulled tight to completely enclose the reel. The cover can also be used in pouch form to protect various sundry items by pulling both drawstrings tightly closed with such drawstrings being used as handles. However, in order to protect various sundry items the device has to be removed, or rather the fishing pole has to be held upright, with the other end closed, and items slipped in. This does not provide for the storage of items while attached to the fishing rod, is cumbersome and in the instance where fishing poles may be attached to the fishing vessel impracticable. Another problem with the invention is that it utilizes a slot formed in the sleeve which may be folded over with a hook material engaging the loop material to close such opening and to prevent any contamination to the interior of the reel jacket. This is cumbersome, and difficult. In summary, the device is difficult to attach and remove, cumbersome, does not allow for the easy storage of a sundry items and not easily adapted to a multitude of different sized reels.

There is an unsatisfied need for a sturdy, self-supporting, removable fishing reel bag, and hook keeper that protects the reel, holds various items and safely secures the lure.

PRIOR ART

U.S. Pat. No. 2,618,880 issued to Sourek discloses a reel cover cylindrical in nature and secured by an elastic band for the protection of the reel from the elements. This device is unsatisfactory for carrying items because of its cylindrical nature. Also, such a device requires many different sizes to be properly suited to a number of different sized reels.

U.S. Pat. No. 4,136,478 issued to Wycosky discloses a cover for a fishing line holding reel that has a receptacle arranged around the handle of a fishing pole on which the reel is mounted so as to cover the reel as well as the handle of the pole. The receptacle is retained on the handle of the pole by a fastener formed from a flexible, elastic element slidably mounted on the receptacle so as to close-up an opening of the receptacle, with the element being looped through itself and terminating in a hook which removable engages an eye of the pole in order to hold the receptacle on the handle of the pole.

U.S. Pat. No. 4,641,454 issued to Ray discloses a protective sock for a fishing reel that fits over a bundle comprising the segmented rod sections and the attached reel. The sock includes a waterproof outer sleeve joined to a soft inner sleeve of non-abrasive padded material. Constructing tapes which may be closed by a closure of the hook-and-loop variety are sewn into the outer sleeve at either end so that the sock may be fastened about the bundle enclosing the reel within.

U.S. Pat. No. 4,876,819 issued to Clifford discloses a fishing reel protector having a plurality of pockets fashioned to accommodate a portion of the reel to be protected. The '819 patent utilizes an elastic band to secure the reel protector to the reel. This is not securely fastened to the reel and is susceptible to easily falling off and is cumbersome.

U.S. Pat. No. 5,501,029 issued to McDaniel discloses a fishing reel cover for covering a fishing reel including a first side member, a second side member, and a rotatable spool extending between the first and second side members with each of the first and second side members having an outer perimeter wall. The fishing reel cover includes a flexible body member for extending around the outer perimeter walls of the first and second side members of the fishing reel and for covering the rotatable spool of the fishing reel.

U.S. Pat. No. 5,699,632 issued to Stout discloses a fishing mitt for keeping the hand of a fisher warm while maintaining sensitivity on a fishing rod. The mitt has a shell and insulating lining configured with a size and shape to encircle the hand of a fisher. A first opening is provided through which a user may dispose a hand within the mitt. The mitt includes a second opening near the outer end of the mitt which is adapted to snugly receive a fishing rod handle extending there through so that the hand of the fisher may grip the rod handle in direct contact. Protective end cover containing a fastener may be unfastened to allow access to the second opening or closed to cover the second opening when the mitt is not used in cooperation with a rod handle.

U.S. Pat. No. 6,263,610 issued to Doubts discloses a protective covering for a fishing reel and attached rod segment which consists of a cylindrical sleeve made of single-layer waterproof fabric to which drawstrings, provided with spring-actuated locking devices, are attached at both ends. The device is slid up over the base of the rod, up over the reel, at which point the drawstrings are pulled tight to completed enclose the reel.

Other prior art has shown shortcomings in the ability to cover large reels, the ease to which the reel cover can be secured around the attached reel and pole, and the need to safely secure the lure.

OBJECT OF THE INVENTION

It is the central object of the present invention to provide a single reel bag from a continuous piece of fabric having four communicating seams to form a free-standing structured bag. A structured bag is upstanding, has added stability and the ability to securely carry larger and heavier items, without the fear of losing the cover or the items contained within.

It is a purpose of the present invention to provide for a quick, easily attached and removable cover for reels mounted on rods. The cover is used to protect the reel from dust, sand and other foreign elements, and to hold various related items.

Another object of the present invention is to provide for a simple to construct and use cover for various sundries.

Another object of the present invention is to provide a waterproof cover and carrier for the reel and various items contained within the reel cover.

Another object of the present invention is to safely sure the lure, to avoid injury and damage to the rod.

Another object of the present invention is to provide a reel cover that can be used interchangeably on vehicle mounted surf rods and rods mounted in rod holders on fishing vessels.

SUMMARY OF THE INVENTION

After much research and study of the above-described problems, the present invention has been developed to provide a combination reel cover and sundries pouch. The fishing reel bag in accordance herewith is reversibly attached over a rod handle and attached reel allowing the cover to provide a simple yet effective means for protecting a rod-mounted reel from exposure to the weather, dirt, grime, ultra violet radiation and various other contaminants. Moreover, the present invention protects other items within the bag from damage. Additionally, the present invention protects the carrier of the rod from injury by safely securing the hooks of a lure while storing and transporting the rod and reel. The assembled rod, reel and lure can be utilized quickly in this way.

The present invention is constructed to provide a series of seamed free-standing sides. There is a multitude of sides to provide openings capable of receiving different portions of the reel, such as the reel foot and reel handle. Depending on the type of reel, the placement and size of the openings are adjustable according to reel type and size. Also, the front of the fishing reel bag is adapted for securing a hook keeper across the face thereof.

Other objects and advantages of the present invention will become apparent and obvious from a study of the following description and the accompanying drawings which are merely illustrative of such invention.

BRIEF DESCRIPTION OF THE DRAWINGS

It should be understood, by one skilled in the art, that the drawings depict certain embodiments of the invention and therefore are not to be considered a limitation in the scope of the instant invention, but that these and other advantages of the present invention will be more fully understood by reference to the following detailed description when read in conjunction with the attached drawings in which.

DETAILED DESCRIPTION

To wit, turning now with more specificity to the drawings, wherein like numerals depict like parts numeral 11 shall depict the fishing reel bag generally according to the preferred embodiment for use with a spinning reel, and numeral 41 shall depict the fishing reel bag according to the preferred embodiment for use with a bait casting reel. Within the art it is well known that there are spinning reels and bait casting reels. Spinning reels of the open faced variety are generally mounted on the underside of the fishing rod, while bait casting reels are mounted thereabove. Described herein are alternate embodiments, with FIG. 1, FIG. 2, FIG. 3, FIG. 4 and FIG. 5 depicting the present invention for use with a spinning reel and FIG. 6, FIG. 7, FIG. 8, FIG. 9 and FIG. 10 for use with a bait casting reel.

Figure 1:
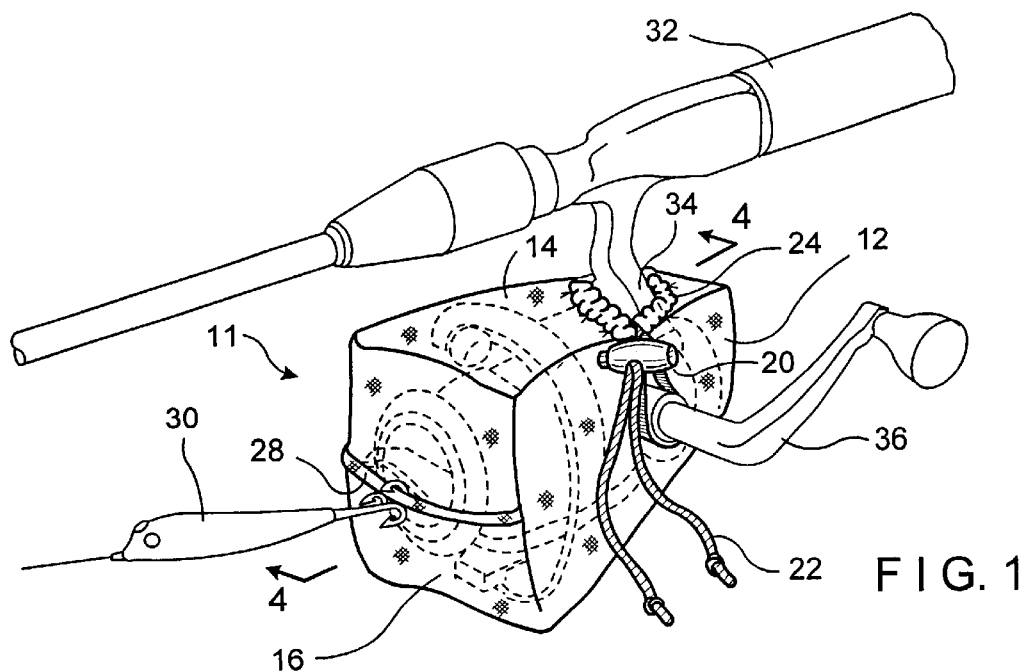
FIG. 1 is an elevational view in perspective of the fishing reel bag for a spinning reel.

FIG. 1 depicts a preferred embodiment for use with a spinning reel. The Fishing Reel Bag 11 is used to cover a spinning reel attached to fishing rod 32. It is preferred that Fishing Reel Bag 11 be constructed of a water resistant and dirt resistant material. The material is preferred to have a structural rigidity so that when it is sewn or joined it will be upstanding. Therefore such materials as neoprene, heavy polymers, heavy treated cloth (Goretex treated ballistic nylon cloth), suede leather, waterproof leather, rubber, vinyl and combinations thereof are preferred. Fishing Reel Bag 11 is also preferably constructed from a piece of continuous material, shaped such as to allow for the sewing or folding of different edges to create at least an opening. According to the preferred embodiment depicted, two openings are created by the communication of the folded and sewn flaps. One opening is adapted for receiving the reel foot 34 through said opening, wherein said reel foot 34 is attached to the reel seat of fishing rod 32. The other opening is adapted to accommodate reel handle 36. The Fishing Reel Bag 11 encases the fishing reel portion of the rod, as shown covered. The flaps are irreversibly connected by any means known within the art. According to the preferred embodiment as depicted, the flaps are in communication by means of a seam. It is known within the art that constructing the flaps may be successfully accomplished by a number of different methods including sewing, adhesives, heat sealing, and the like.

A drawstring 22 is run through drawstring edging material 24, said material 24 being folded over on itself to create a channel therethrough, which is used to line the reel foot 34 opening created. The drawstring edging material 24 may be ribbed, folded or elastic. According to the preferred embodiment depicted, the drawstring edging materials are ribbed, to provide for greater articulation around the reel handle. By actuating the closure means 20, which according to the preferred embodiment depicted is a spring-actuated locking device, to a desired position, the Fishing Reel Bag 11 may be adjusted around the fishing reel, as shown covered. As such the Fishing Reel Bag 11 is adjustable to a multitude of different sizes and shapes, while still protecting the fishing reel, as shown covered. There is a top flap 14, front flap 16, hook keeper 28, right flap 12, left flap 18, top flap 14 and back flap 38. The front flap 16 and top flap 14 are one continuous piece of material, folded to form the sides of the bag. The hook keeper 28 consists of two ends. One end is interposed between the front flap 16 and the left flap 18 and the other end of hook keeper 28 being interposed between the front flap 16 and right flap 12, such that the hook keeper 28 is substantially parallel to the top flap 14. As stated hereinabove, for purposes of the present invention a seam may be either sewn, heat sealed, glued or any other well known joining operations as well as combinations thereof.

Figure 2:
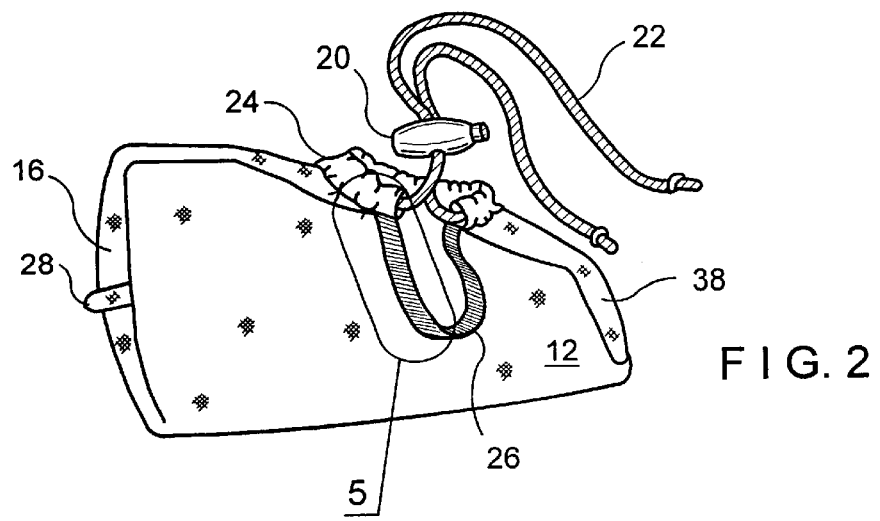
FIG. 2 is a side view in perspective with the opposite side being the same thereof.

As shown in FIG. 2, when the flaps are in communication, the sewn edges create a sealed enclosure. An opening is created, drawstring edging material 24 is sewn around the opening created where the top flap 14, right flap 12, left flap 18 and back flap meet. A drawstring 22 is run through the drawstring edging material 24 and a closure means 20. According to the preferred embodiment depicted without limitation, this is a spring actuated fastener, or an elliptically shaped snug with at least a hole adapted to receive the drawstring. The opening is suited for receipt of the reel foot 34. A second opening exists for the receipt of the reel handle 36. This opening is preferably, without limitation, the peripheral edge thereof being constructed in a ribbed, gathered, accordion pleated or elasticized material. It is most preferred to be constructed of a ribbed elastic material.

Figure 3:
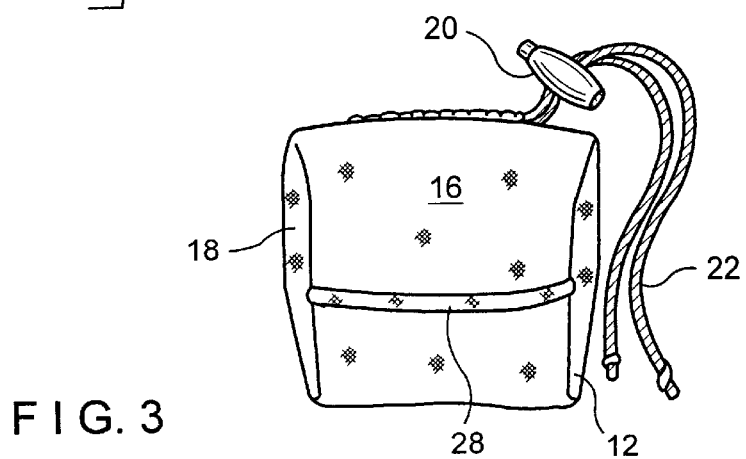
FIG. 3 is a front view in perspective thereof.

FIG. 3 depicts a front view in perspective thereof the Fishing Reel Bag 11. As shown the hookkeeper 28 is used to safely keep the hook. The closure means 20 and drawstring 22 are used to removably attach the Fishing Reel Bag around reel, as shown covered. The closure means according to the preferred embodiment is a spring-actuated locking device. This allows for easy adjustment of the bag. Also, because there is a drawstring the bag size is adjustable to accommodate a multitude of different sized reels.

Figure 4:
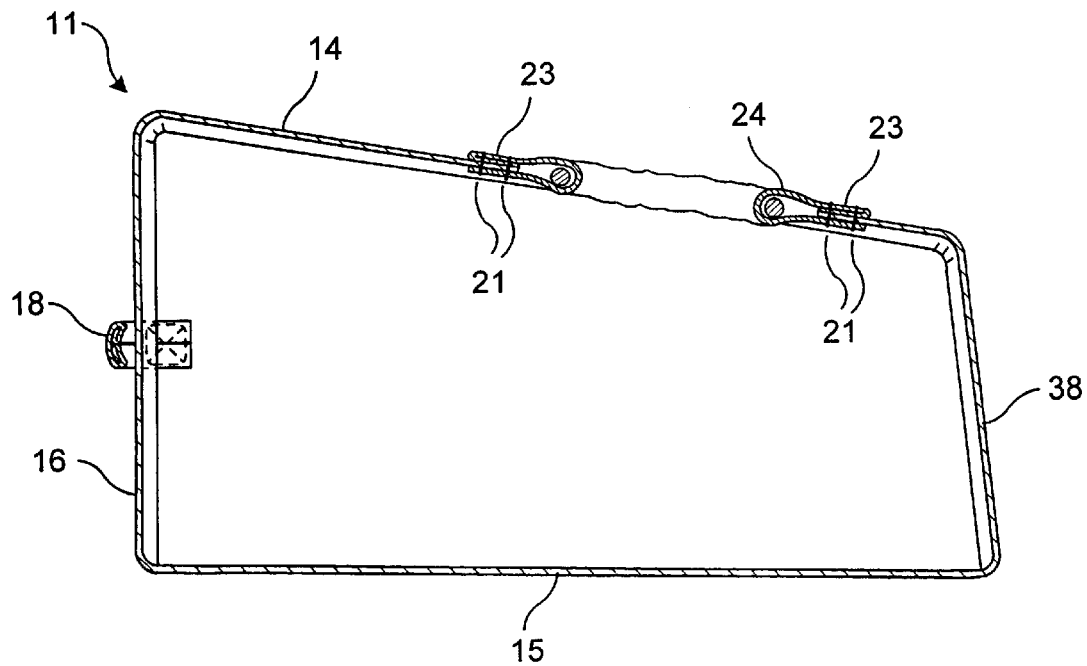
FIG. 4 side plan view taken along lines 4—4 of FIG.

FIG. 4 is the best illustration of hook keeper 28. As shown, one end of the hook keeper 28 is securely interposed between the front flap 16 and the left flap 18. The other end of the hook keeper 28, which is not shown in the cut away, is securely interposed between the front flap 16 and right flap 12. Also shown the drawstring edging material 24 surrounds the opening created by where the top flap 14, right flap 12, left flap 18 and back flap 38 meet. The drawstring edging material 24 is irreversibly attached by any means known within the art, such as seams and adhesives. According to the preferred embodiment shown, seams 21 are used to irreversably attach the drawstring edging material 24. The drawstring 22 is then run through the channel created by the drawstring edging material 24. This allows for adjustment of the Fishing Reel Bag 11 around the fishing reel 32.

Figure 5:
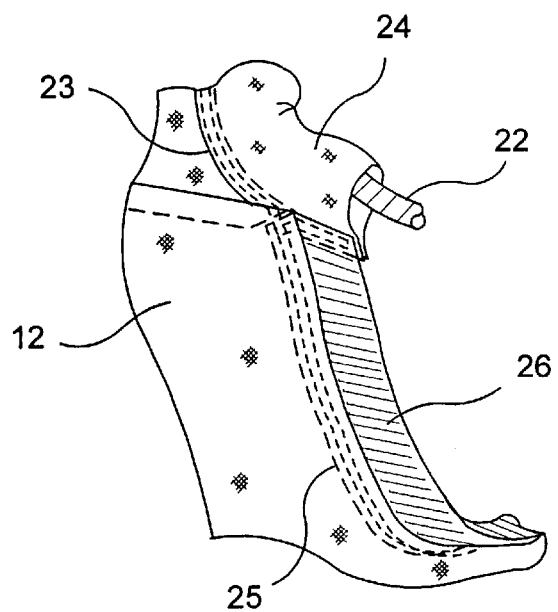
FIG. 5 is plan view of the drawstring and seam thereof taken along lines 5—5 of FIG. 2.

FIG. 5 depicts in more detail the drawstring edging material 25 and seams 23 thereof. As shown in the diagram, the drawstring edging material 24 is placed on either side of the opening and sewn in place. As shown, seams 23 irreversibly attach the drawstring edging material 24 to the opening created by where the top flap 14, right flap 12, left flap 18 and back flap 38 meet. The drawstring 22 is run through the drawstring edging material 25. Sewn in the opening created for receipt of the reel handle 36, is a reinforcing material 26, which is irreversibly attached by seams 25. According to the preferred embodiment depicted the reinforcing material 26 is preferably ribbed to provide for greater articulation around the reel handle 36. Moreover, ribbed material provides for a more rugged construction.

Figure 6:
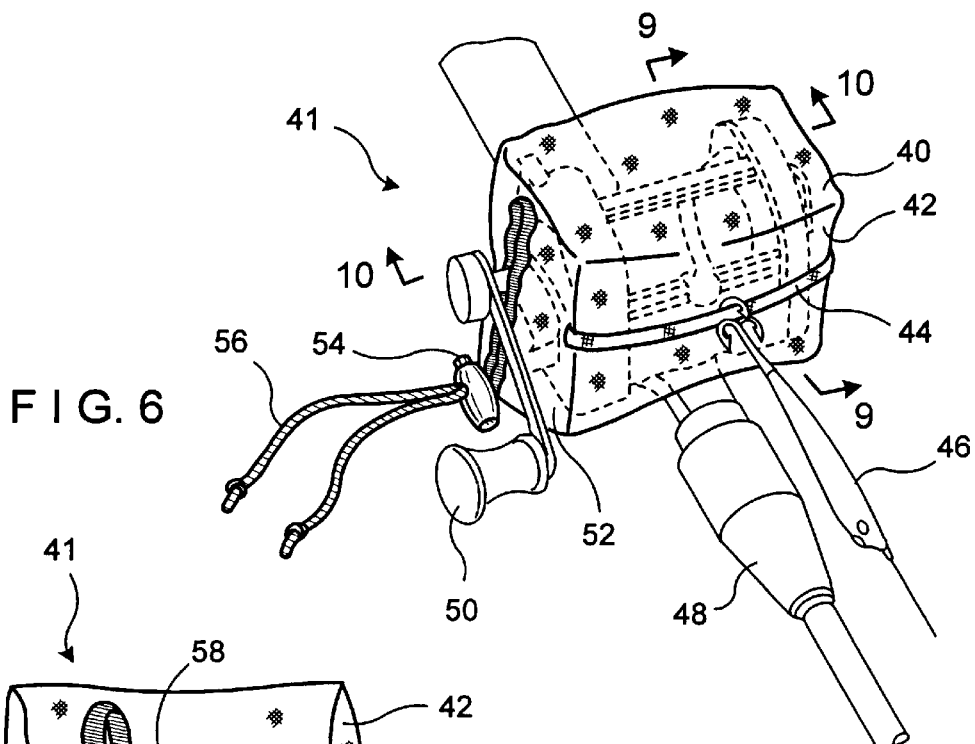
FIG. 6 is a perspective view of the fishing reel bag for a bait casting reel.

FIG. 6, FIG. 7, FIG. 8, FIG. 9 and FIG. 10 depict a preferred embodiment for use with a bait casting reel 48. As shown, a single continuous piece of fabric is shaped such that there is a front flap 42, top flap 40, left flap 52, right flap 64, back flap 62. It should be understood that the certain edges are irreversibly attached, such as by a seam, and other edges are foldedly created. Drawstring edging material 60 is sewn along the edges of the front flap 42, left flap 52, right flap 64 and back flap 62. According to the preferred embodiment shown, an opening is created for receiving the reel handle 50 along the left flap 52. The opening is created by a the removal of material, then reinforced by a reinforcing edging material 58 sewn around the opening. The reinforcing material 58 is made of ribbed material such that is provides for greater articulation around the reel handle and is more rugged. This may also be an accordion pleat folded strip sewn around the opening. As shown in FIG. 6 this embodiment is for use with a bait casting reel 48. The Fishing Reel Bag 41 encases the reel, allowing an opening for the reel handle, and the attachment of a fishing lure 46.

Figure 7:
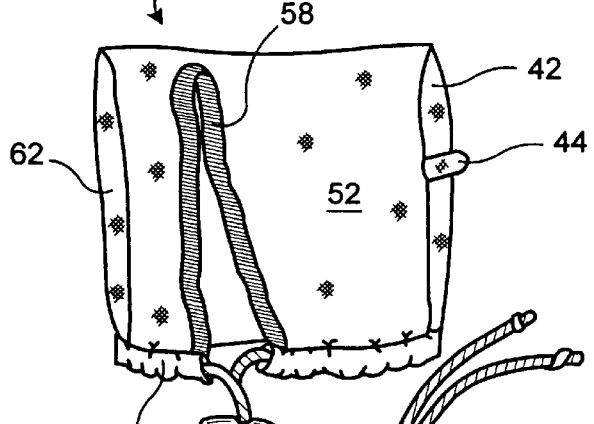
FIG. 7 is a top view in perspective thereof.
Figure 8:
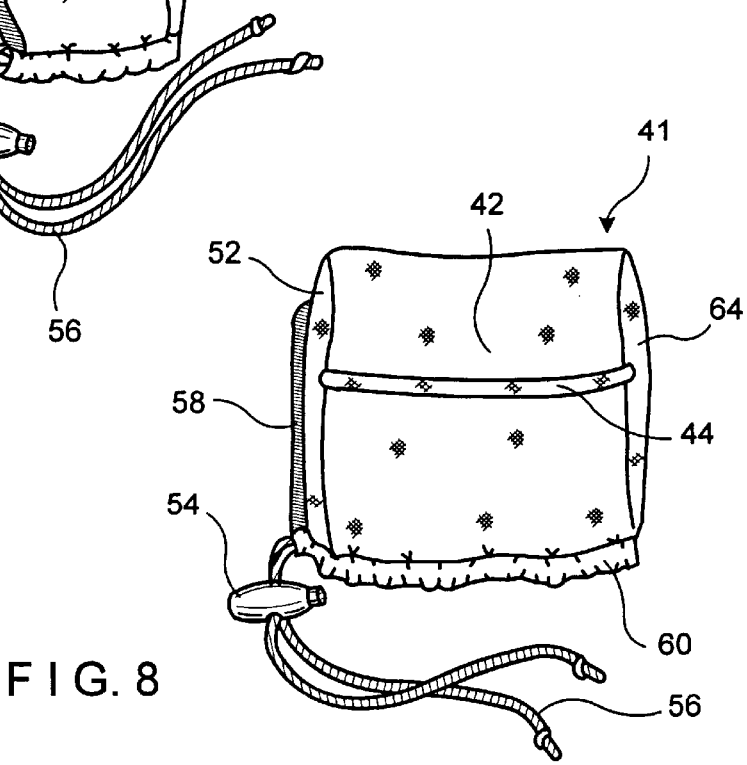
FIG. 8 is a front view thereof with a hook keeper.

As shown in FIG. 7 and FIG. 8, certain edges of the bag are created by folding, and other edges are created by irreversible attachment means, such as a seam or heat sealed. Seams are sewn between the front flap 42 and left flap 52. A seam is sewn between the front flap 42 and left flap 64. The left flap 52 and back flap 62 are irreversibly attached by a means, such as a seam. Right flap 64 and back flap 62 are irreversibly attached by a means such as a seam. All edges created by the top flap 40 are folded, not sewn. A bottom portion is created by pulling the drawstring, to close the opening created.

Hook keeper 44 is adapted to reversibly engage the hook of a lure 46. Hooks are not only sharp but are of great tensile strength, having the capability to wear through an attachment site. Therefore, the hook keeper 44 should be fashioned from a material which resists mechanical destruction. A heavy polymer would be preferred for this embodiment.

Figure 9:
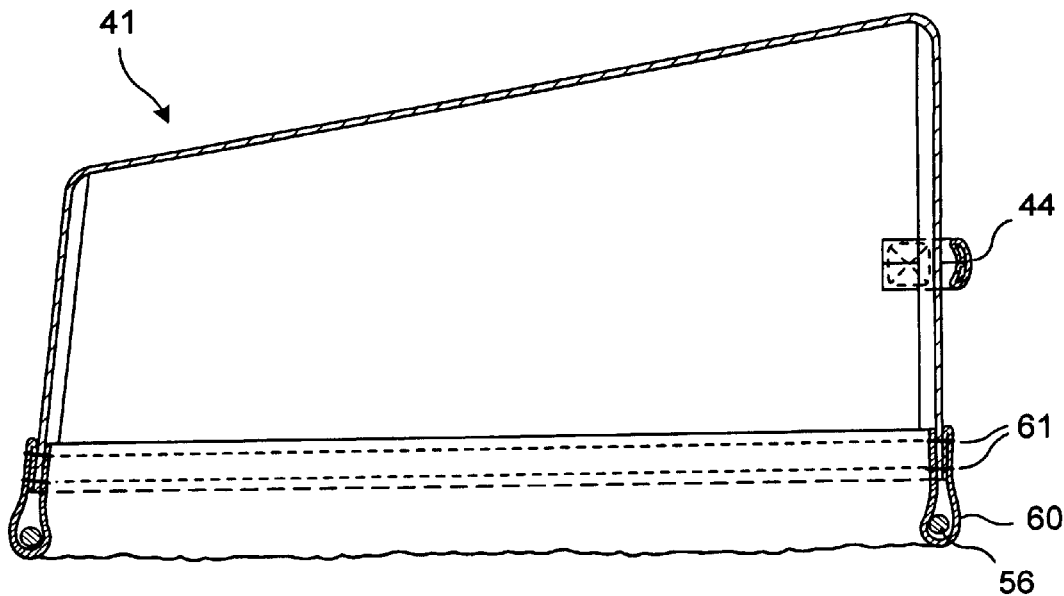
FIG. 9 is a side plan view taken along line 9—9 of FIG. 6 thereof with the opposite side being the same.

FIG. 9 depicts a side plan view taken along line 9—9 of FIG. 6. The hook keeper 44 consists of two ends, the first end being placed in between the left flap 52 and the front flap 42 and irreversably connected. According to the embodiment shown, the hook keeper 44 is irreversably connected by a seam. The drawstring edging material 60 is folded around the bottom edges of the front flap 42, left flap 52, right flap 64, and back flap 62. The folded material is folded such that a channel is created and seams 61 irreversibly attach the drawstring edging material 60 to the Fishing Reel Bag 41. A drawstring 56 is run through the channel. By pulling the drawstring 56 and moving the closure means 56 further away from its ends, the area opposed to the top flap 40 is protected.

Figure 10:
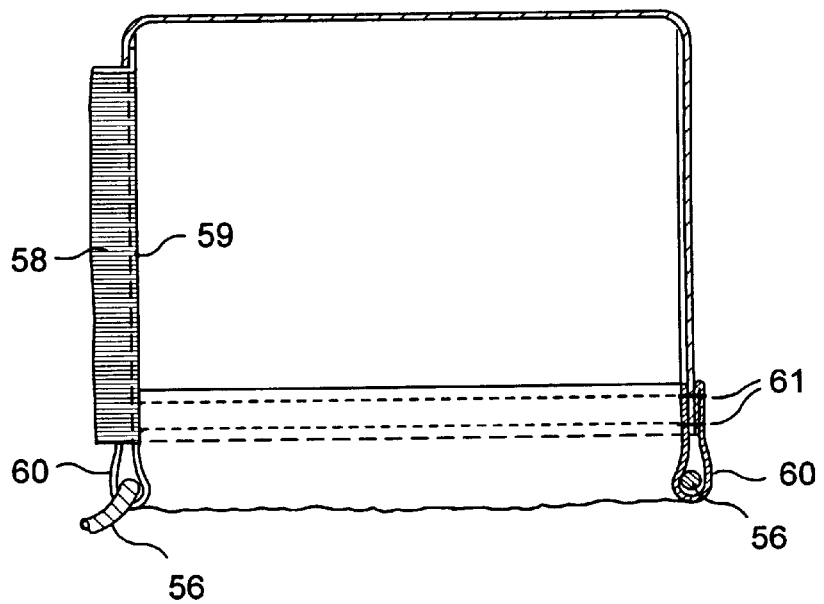
FIG. 10 is a top plan view showing the drawstring and seam taken along lines 10—10 of FIG. 6 thereof with the opposite side being the same.

FIG. 10 is a top plan view showing the drawstring and seam taken along lines 10—10 of FIG. 6. The reinforcing material 58 may be ribbed, gathered, pleated, accordion folded or any other material known within the art. According to the preferred embodiment depicted the reinforcing material 58 is a ribbed elastic material and may be either sewn from the underlying material or from an elastic type material so that the finished edge provides an enclosure sufficient to retard the entry of moisture and dirt.

Unlike designs in accordance with the prior art it should be noted that Fishing Reel Bag 11 and Fishing Reel Bag 41 can be constructed from a single piece of material. The resulting apparatus may be economically duplicated with a single cutting procedure. Other molded or multi-piece bags do not enjoy this advantage.

These and other objects, advantages, features and aspects of the present invention will become apparent as the following description proceeds. While the foregoing embodiments of the invention have been set forth in considerable detail for the purposes of making a complete disclosure of the invention, it will be apparent to those of skill in the art that numerous changes may be made in such details without departing from the spirit and the principles of the invention.

I claim:

1. A structurally rigid and freestanding fishing reel bag of a single continuous waterproof material comprising:
    a single continuous waterproof material, wherein said single continuous waterproof material is comprised of a top flap, a bottom flap, a front flap, a back flap, a left flap and a right flap in communication to accommodate and receive a portion of a fishing reel;
    a seam connecting said front flap to said left flap,
    a seam connecting said front flap to said right flap;
    a seam connecting said back flap to said left flap;
    a seam connecting said back flap to said right flap;
    a drawstring closure means to removeably attach said bag to said fishing reel;
    a first opening for receipt of a reel foot of said fishing real;
    a second opening for receipt of the reel handle of said fishing reel; and
    a hook keeper substantially horizontally parallel to said top flap, consisting of a first end disposed between said front flap and said left flap and a second end disposed between said front flap and said right flap.

2. A free-standing fishing reel bag of a single continuous waterproof material comprising:
    a top flap, a bottom flap, a front flap, a back flap, a left flap and a right flap in communication to accommodate and receive a portion of a fishing reel;
    a seam connecting said front flap to said left flap;
    a seam connecting said front flap to said right flap;
    a seam connecting said back flap to said left flap;
    a seam connecting said back flap to said right flap;
    an opening adapted to receive said fishing reel;
    a hook keeper substantially horizontally parallel to the top flap, consisting of a first end disposed between said front flap and said left flap and a second end disposed between said front flap end said right flap; and
    a closure means to removeably attach said bag to said fishing reel.

3. A free-standing fishing reel bag of a single continuous waterproof material comprising:
    a top flap, front flap, a back flap, a left flap and a right flap in communication to accommodate and receive a portion of said reel;
    a seam connecting said front flap to said left flap;
    a seam connecting said front flap to said right flap;
    a seam connecting said back flap to said left flap;
    a seam connecting said back flap to said right flap;
    at least one opening adapted to receive a fishing reel;
    a hook keeper substantially horizontally parallel to the top flap, consisting of a first end disposed between said front flap and said left flap and a second end disposed between said front portion flap and said right flap; and
    a closure means to removeably attach said bag to said reel.

\* \* \* \* \*